June 13, 1950 L. E. W. MONTROSE-OSTER 2,511,075
INFINITELY-VARIABLE REPRODUCING OR REPEATING DEVICE
Filed Feb. 25, 1948
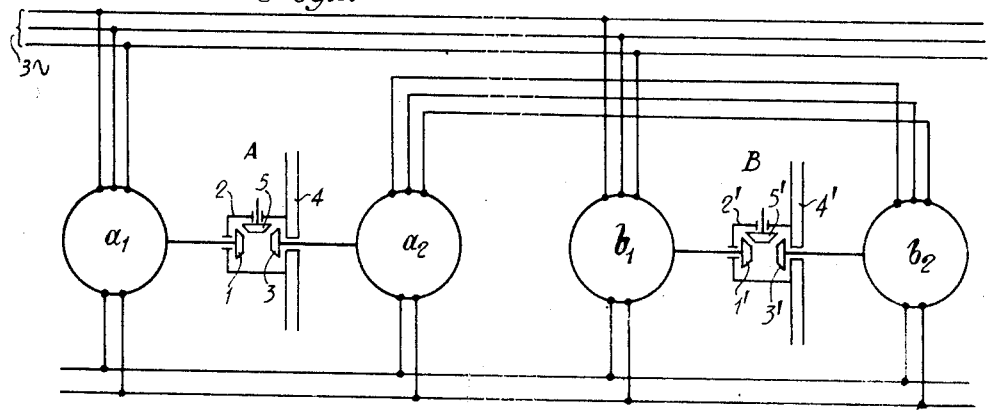
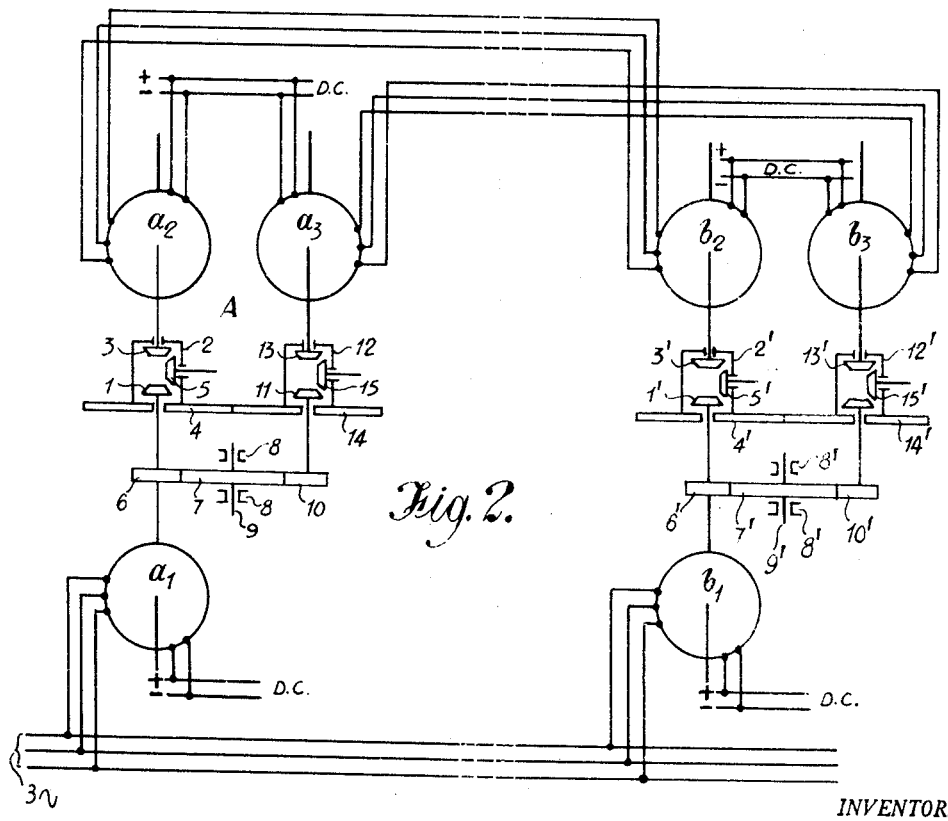
INVENTOR.
LOUIS E. W. MONTROSE-OSTER
BY
Blair, Curtis & Hayward.

Patented June 13, 1950

2,511,075

UNITED STATES PATENT OFFICE 2,511,075

INFINITELY VARIABLE REPRODUCING OR REPEATING DEVICE

Louis Eugène Widolt Montrose-Oster, Brussels-Boitsfort, Belgium, assignor of one-half to Pollopas Patents Limited, London, England, a British company Application February 25, 1948, Serial No. 10,805 In Great Britain April 20, 1939

Section 1, Public Law 690, August 8, 1946 Patent expires April 20, 1959

4 Claims. (Cl. 318—19)

There are in existence a number of infinitely-variable repeating arrangements employing mechanical, hydraulic, or even electrical transmission, the use of which is however somewhat limited by reason of their nature. In fact, whilst the first two systems can only operate when the transmitting and receiving stations are very close together, the third can transmit only a very weak torque, for example, sufficient for telegraphy. When it is desired to transmit torques of reasonable magnitude (for example, through relays) by means of an arrangement of this kind, a time-lag is introduced which is usually disadvantageous.

Especially in the case of repeating-systems used for defensive purposes, comprising for example a gun on the one hand and an aiming device or sight on the other, there is required a repeater which will not only provide an infinite number of possible positions (i. e. an infinitely-variable system) but produce the required repetition with a minimum of lag, whether of time or space.

An object of the present invention is to provide a very simple system which fulfills all these requirements, is capable of being operated over considerable distances and of transmitting forces of considerable magnitude.

According to this invention an infinitely-variable reproducing or repeating device comprises two synchronous dynamo-electric machines and a differential device at a transmitting station and at a receiving station, one of the machines at each station being fed with alternating current of constant periodicity, while the other two are electrically inter-connected, one of said interconnected machines being adapted to operate as a generator and the other as a receiver, whereby the periodicity of the alternating current flowing from generator to receiver decreases when the differential rotates in one direction and increases when the differential rotates in the other direction.

According to a further feature of this invention three synchronous machines and two differential devices are employed at each station, one of the machines at each station being fed with alternating current of constant periodicity, while the two others are electrically interconnected in pairs, and the two differential devices pertaining to each station have their housings geared directly together and geared indirectly, through the intermediary of an idler pinion having a fixed axis, with their primary trunnions, whereby rotation of the differential in either direction increases the periodicity of the alternating current flowing between one pair of synchronous machines and reduces that of the alternating current flowing between the two synchronous machines of the other pair.

The described sets of synchronous machines and differential devices at the transmitting and receiving stations provide for reproducing or repeating angular movements about one axis. Angular movements about several axes naturally require as many of the described sets as there are axes.

Reference is made to the accompanying diagrams in which Figure 1 illustrates one form of the invention and Figure 2 a modified form hereinafter referred to. The transmitter is generally indicated by A and the receiver by B.

In one arrangement for carrying the invention into effect, diagrammatically illustrated in Figure 1, a synchronous motor $a1$ has its stator fed by a 3-phase system of constant periodicity, whilst its rotor is fed by direct current and the motor-shaft drives a pinion 1 of a differential gear, the opposite pinion 3 of the differential gear being keyed or otherwise secured to the shaft of an alternator $a2$. The third pinion 5 forming the differential is mounted on the inside of the housing 2 as usual. An operating member 4 is secured to the differential housing 2 and adapted to be moved by the transmitter, which, for example, may be a gun mounting. The arrangement of the synchronous motor $b1$ and alternator $b2$ at the receiving station B is identical with that of the transmitter A. The stators of the alternators $a2$, $b2$, of which the rotors are fed by direct current, are connected to each other by a number of leads corresponding to the number of their phases, for example, three wires corresponding to three phases, but it is possible and even desirable to provide the alternators with polyphase windings.

In operation, when the operating members 4, 4' secured to the housings of the two differentials are held stationary, the alternators $a2$, $b2$ at the transmitter and receiver will rotate at the same speed as the two synchronous motors $a1$, $b1$, but in the reverse directions.

Assuming that the mains supply is a 3-phase current at 50 cycles and that the rotors of the synchronous motors are of 4-pole type, these will each rotate at 1500 R. P. M. when the operating members 4, 4' and the housings 2, 2' of the differentials are held stationary.

In the case of the operating member 4 at the transmitter being connected to the mounting of a gun and the operating member 4' at the receiver to that of the sighting apparatus, nothing will happen as long as the gun mounting does not move. As soon as the mounting commences to make an angular movement, the operating member 4 connected thereto will rotate correspondingly. The synchronous motor will maintain its speed constant at 1500 R. P. M., but the alternator $a2$ driven therefrom will increase or reduce its speed according to the direction of motion of the operating member, which causes the periodicity of the current delivered by the alternator $a2$ to increase or diminish correspondingly.

Both alternators $a2$ and $b2$ being synchronous machines, the receiving alternator $b2$ will be drawn into synchronism with the transmitting alternator $a2$. In this way the element 4' will be driven in agreement with the element 4.

While in the example given, movement of the gun mounting is transmitted to the gun sight it will be understood that movement of the sight may also be transmitted to the mounting.

The difference in angle which can exist between the rotors of two alternators, one acting as generator and the other as motor, being a function of the load on the one hand and the electrical angle on the other, it is desirable to select for this purpose machines of which only a fraction of the full power is used and the electrical angle is naturally very small.

In order to obtain proper functioning, the system may be provided, in conjunction with the transmitter, with means disposed outside the device "A" proper, for taking up reaction against which means the member 4 bears or is counter-supported for the purpose of arresting the differential and thus of transmitting the motive force to the alternator $a2$. The provision of such means presents no difficulty in all cases in which the primary device, for example a gun-mounting is relatively heavier than the responsively operated device, for example, a sighting instrument. However, it will be appreciated that if it is required for example to embody the invention in an arrangement in which the opposite conditions obtain, the sighting device would not afford a sufficiently stable counter-support to withstand the reaction of the gun mounting.

In a case of this kind it will be necessary either to interpose relays or to employ an embodiment of the invention of the modified kind indicated diagrammatically in Figure 2.

This modified form of construction differs from that shown in Figure 1 solely in this, that the number of alternators and differential gear units employed is doubled, that is to say, that instead of driving an alternator $a2$ and $b2$ respectively, the synchronous motors $a1$ and $b1$ each drive two such alternators, that is to say $a1$ drives the alternators $a2$ and $a3$, while the motor $b1$ drives alternators $b2$ and $b3$. While the differentials 11, 12, 13, 14, 15 and 11', 12', 13', 14', 15' correspond exactly to the differentials, 1, 2, 3, 4, 5 and 1', 2', 3', 4', 5', these differential gear units differ from each other as to their function. Thus it will be noted that if the discs 4, 14, and 4', 14' mesh directly, the gear wheels 6, 10, and 6', 10' will mesh indirectly with each other through intermediate pinion arrangements 7, 8, 9 and 7', 8', 9' respectively. It follows that the gear wheels 6, 10 and 6', 10' are positively rotated in the same sense, and that the housings of the differential gears 2, 12 and 2', 12' have the tendency to do the same. Now, seeing that these housings are directly coupled together by means of the gear wheels 4, 14 and 4', 14' they will counter-act each other, thus producing a state of equilibrium and suppressing all reaction against any external support other than 8, and 8' respectively.

It will be understood that the described device is intended to serve merely as an example of the embodiment of the invention, and that any arrangement embodying this principle comes within the scope of the present application, even if it employs other means for establishing equilibrium between the systems, for instance hydraulic differential devices instead of differential gear units.

It will be understood that for reproducing or repeating movements about two or more axes, it will be necessary to provide as many sets A and B as there are axes, the movement about each axis requiring a transmitting and receiving group to itself.

The present invention has the advantage of utilising electric motors rotating always at relatively high speeds, even when the mechanisms they control are stationary. This avoids all sluggishness, the torque produced being as instantaneous as it is powerful.

In order to avoid the oscillation often observed with synchronous motors, it is desirable to provide the rotor systems with appropriate auxiliary squirrel-cage windings.

It should be noted that the power transmitted to the receiving post is not supplied by the mains, but is derived from the torque acting on the transmitting mechanism. This is external to the electric motors, which function only as torque-transmitters, using three separate electric currents.

I claim:

1. An infinitely variable reproducing or repeating device for transmission of movement between transmitting and receiving stations, comprising at a transmitting station and at every receiving station, a plurality of synchronous dynamo-electric machines each having one rotor and one fixed stator and adapted to operate as alternators or motors, means for operating one of said machines at every station as a motor with alternating current of constant frequency so that said motor at every station operates at a constant and equal speed, the others of said machines being electrically interconnected in at least one group comprising one machine at every station and being driven as alternators by said motors through differential means having rotatable housings which remain stationary while the speeds of the motors and alternators connected thereto are equal the frequency of the generated alternating current transmitted in said interconnections between the alternators increasing or decreasing in accordance with the sense of rotation of the housings of the differential means.

2. An infinitely variable reproducing or repeating device for transmission of movement between transmitting and receiving stations, comprising at a transmitting station and at every receiving station two synchronous dynamo-electric machines, each having one rotor and one fixed stator and adapted to operate as alternators or motors, means for operating one of the machines at every station as a motor with alternating current of constant frequency so that said motor at every station operates at constant and equal speed, the others of said machines being electrically interconnected in a group comprising one machine at every station and being driven as alternators by said motors through differential means having rotatable housings which remain stationary while the speeds of the motor and alternator connected to each of them are equal the frequency of the generated alternating current transmitted in said interconnections between the alternators increasing or decreasing in accordance with the sense of rotation of the housings of the differential means.

3. An infinitely variable reproducing or repeating device for transmission of movement between transmitting and receiving stations, comprising at a transmitting station and at every receiving station three synchronous dynamoelectric machines each having one rotor and one fixed stator and adapted to operate as alternators or motors, means for operating one of said machines at every station as a motor with alternating current of constant frequency so that said motor at every station operates at constant and equal speed, two differential driving units at every station driven in the same direction of rotation by said motor and mechanically connecting the said motor with the other two machines so as to drive both said other two machines as alternators in the same direction of rotation, said two differential units having rotatable housings geared directly together whereby they tend to rotate in opposite directions, the other two machines at every station being electrically interconnected in two groups each of which comprises one of said two machines at every station, whereby rotation of the differential means in one sense causes the frequency of the alternating currents transmitted in the interconnections of the two groups of alternators to increase in one group and decrease in the other group from the value obtaining when the differential means are stationary, and to decrease in the said one group and increase in the said other group when the sense of rotation of the differential means is reversed.

4. An infinitely variable reproducing or repeating device for transmitting movement from a transmitting station to a receiving station, comprising at each station a plurality of similar synchronous dynamo-electric machines each having one D. C. rotor and one A. C. fixed stator and adapted to operate as alternators or motors, means for supplying direct current to the rotor and alternating current of constant frequency to the stator of one machine at every station for operating said machine as a motor at constant and equal speed, means for supplying the rotors of the others of said machines with direct current, means electrically interconnecting the stators of said other machines in at least one group comprising one machine at every station, a differential gear mechanically connecting the said motor with the machine of each group at every station to operate said machine as an alternator to generate alternating current in its stator of a frequency dependent upon the speed of the alternator, each differential gear including a rotatable housing which remains stationary so long as the speeds of the said motor and alternator of each group connected thereto are equal, whereby the frequency of the alternating current transmitted in the interconnections between the stators of the alternators varies in accordance with the amount and direction of rotation of the housings of the differential gears.

LOUIS EUGÈNE WIDOLT
MONTROSE-OSTER.

REFERENCES CITED

The following references are of record in the file of this patent:

UNITED STATES PATENTS

| Number | Name | Date |
| --- | --- | --- |
| 1,200,656 | Schneider | Oct. 10, 1916 |
| 1,686,327 | Illauer | Oct. 2, 1928 |
| 1,881,011 | Wittkuhns | Oct. 4, 1932 |
| 2,130,899 | Peters | Sept. 20, 1938 |